US009298222B2

(12) United States Patent
Blair et al.

(10) Patent No.: US 9,298,222 B2
(45) Date of Patent: Mar. 29, 2016

(54) TOUCH SENSOR WITH PLASTIC COVER LENS

(71) Applicants: Thomas Blair, Manitou Springs, CO (US); Neerja Saran, Fremont, CA (US); Jalil Shaikh, Fremont, CA (US); Esat Yilmaz, Santa Cruz, CA (US)

(72) Inventors: Thomas Blair, Manitou Springs, CO (US); Neerja Saran, Fremont, CA (US); Jalil Shaikh, Fremont, CA (US); Esat Yilmaz, Santa Cruz, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/135,329

(22) Filed: Dec. 19, 2013

(65) Prior Publication Data

US 2014/0267099 A1 Sep. 18, 2014

Related U.S. Application Data (63) Continuation-in-part of application No. 13/841,675, filed on Mar. 15, 2013.

(51) Int. Cl.
*G06F 3/041* (2006.01)
*G06F 1/16* (2006.01)

(52) U.S. Cl.
CPC .............. *G06F 1/1692* (2013.01); *G06F 3/041* (2013.01)

(58) Field of Classification Search
CPC ............................... G06F 3/041; G06F 1/1692
USPC ............................................ 345/173; 349/12
See application file for complete search history.

(56) References Cited

U.S. PATENT DOCUMENTS

| 7,663,607 | B2 | 2/2010 | Hotelling | |
|---|---|---|---|---|
| 7,864,503 | B2 | 1/2011 | Chang | |
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 8,217,902 | B2 | 7/2012 | Chang | |
| 2006/0097991 | A1* | 5/2006 | Hotelling et al. | 345/173 |
| 2008/0158146 | A1* | 7/2008 | Westerman | 345/156 |
| 2008/0309635 | A1 | 12/2008 | Matsuo | |
| 2009/0315854 | A1 | 12/2009 | Matsuo | |
| 2010/0044122 | A1* | 2/2010 | Sleeman et al. | 178/18.06 |
| 2012/0242588 | A1 | 9/2012 | Myers | |
| 2012/0242592 | A1 | 9/2012 | Rothkopf | |
| 2012/0243151 | A1 | 9/2012 | Lynch | |
| 2012/0243719 | A1 | 9/2012 | Franklin | |
| 2013/0076612 | A1 | 3/2013 | Myers | |

(Continued)

FOREIGN PATENT DOCUMENTS

WO WO 2012/129247 A2 9/2012

OTHER PUBLICATIONS

U.S. Appl. No. 61/454,936, filed Mar. 21, 2011, Myers.

(Continued)

*Primary Examiner* — Ariel Balaoing
(74) *Attorney, Agent, or Firm* — Baker Botts L.L.P.

(57) ABSTRACT

According to one embodiment, an apparatus comprises a substrate, a touch sensor, and a cover lens. The touch sensor is disposed on the substrate. A conductive mesh forms portions of the touch sensor, and the conductive mesh comprises fine lines of metal. The cover lens is coupled to the touch sensor and is at most 0.4 mm thick. The cover lens comprises plastic.

24 Claims, 7 Drawing Sheets

(56) References Cited

U.S. PATENT DOCUMENTS

2013/0162583 A1* 6/2013 Simmons et al. ............. 345/174
2013/0175153 A1* 7/2013 Chang ........................... 200/600

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

TOUCH SENSOR WITH PLASTIC COVER LENS

RELATED APPLICATION

This application is a continuation-in-part of U.S. application Ser. No. 13/841,675 filed Mar. 15, 2013, the disclosure being hereby incorporated by reference herein.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor. Touch sensors may further be included in automobiles.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

This disclosure describes a device with a touch sensor. The touch sensor includes a cover lens that is at most 0.4 mm thick. In certain embodiments, the touch sensor further includes drive and sense electrodes formed from fine lines of metal arranged in a two-layer mesh, which may make the electric field between the drive and sense electrodes more uniform near the surface of the touch sensor. As a result of the more uniform field, the thickness of the cover lens may be reduced to 0.4 mm and below without introducing undesirable side effects that touch sensors formed from other materials, such as indium tin oxide, would experience. These problems may include moisture sensitivity and retransmission effects, all of which have the potential to render the device inoperable or otherwise unacceptable.

Figure 1:
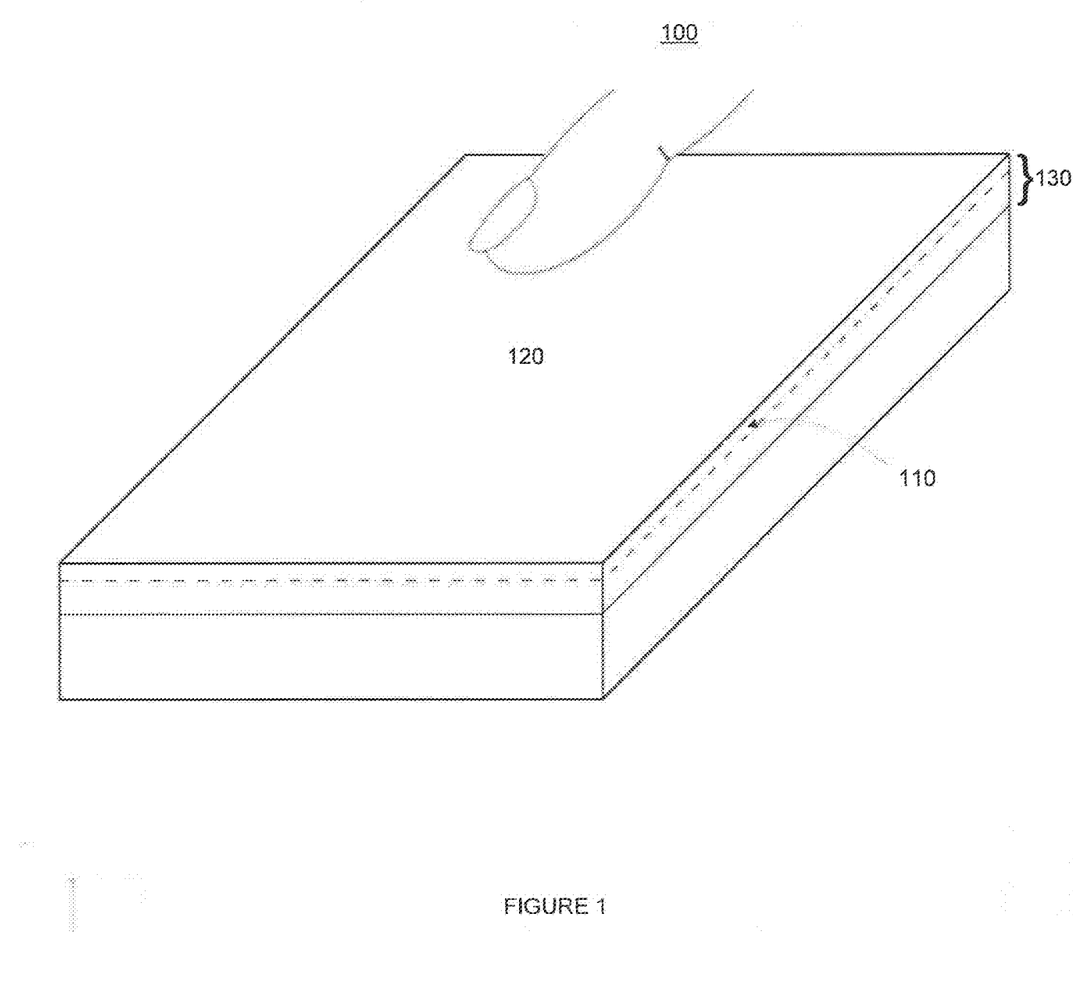
FIG. 1 illustrates an example device with a touch sensor.

FIG. 1 illustrates an example device 100 with an example touch sensor 120. The touch sensor 120 includes a mechanical stack 130. The mechanical stack 130 includes a cover lens 110. In certain embodiments, the cover lens 110 has a thickness of 0.4 mm and below. Even though the cover lens 110 may have a thickness of 0.4 mm and below, moisture sensitivity and retransmission effects may not cause device 100 and/or touch sensor 120 to operate inappropriately.

Device 100 may be a smartphone, a PDA, a tablet computer, a laptop computer, a desktop computer, a kiosk computer, a satellite navigation device, a portable media player, a portable game console, a point-of-sale device, another suitable device 100, a suitable combination of two or more of these, or a suitable portion of one or more of these. This disclosure contemplates any suitable device 100 with any suitable number of any suitable surfaces with any suitable shapes (including but not limited to being planar in whole or in part, curved in whole or in part, flexible in whole or in part, or a suitable combination of these) and any suitable sizes.

Device 100 may include a touch sensor 120. Touch sensor 120 may detect the presence and location of a touch or the proximity of an object (for example a user's finger or a stylus). Touch sensor 120 may extend over portions of one or more surfaces of device 100. This disclosure contemplates device 100 having any suitable number of touch sensors. Touch sensor 120 may be of any suitable shapes and sizes on any suitable number of any suitable surfaces.

Touch sensor 120 may include a mechanical stack 130. The mechanical stack 130 may contain various layers of material, such as a cover lens 110 at the top of the mechanical stack 130, a substrate (or multiple substrates), and the conductive material forming the drive or sense electrodes of touch sensor 120. The cover lens 110 may be clear and made of a resilient material suitable for repeated touching, such as for example glass, polycarbonate, polyethylene terephthalate (PET), or poly(methyl methacrylate) (PMMA), cyclic olefin polymer (COP), cyclic olefin copolymer (COC), fiber reinforced glass, or any suitable plastic. In particular embodiments, the design of the drive and sense electrodes and the substrate of touch sensor 120, and/or the material composition of cover lens 110 allows cover lens 110 to have a thickness at or below 0.4 mm while still reducing or eliminating particular side effects that may cause device 100 to behave inappropriately and/or to not operate at all. The design of the mechanical stack will be discussed further with reference to FIG. 2.

Figure 2:
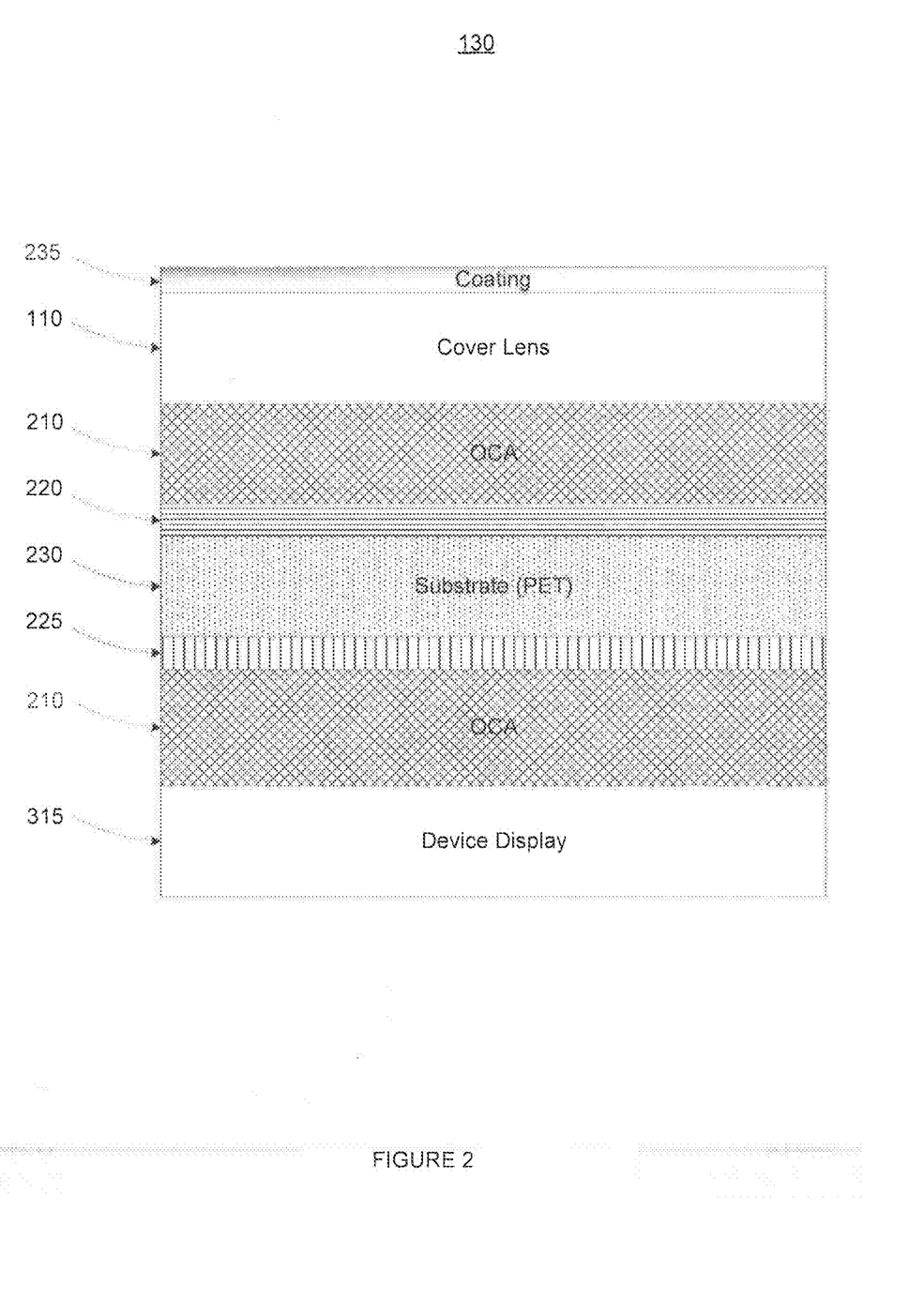
FIG. 2 illustrates an example mechanical stack of the example device of FIG. 1.

FIG. 2 illustrates an example mechanical stack 130 of the example device 100 of FIG. 1. As provided by FIG. 2, the mechanical stack 130 may include a cover lens 110, optically clear adhesive (OCA) 210, a substrate 230 comprising PET, drive electrodes 225, and sense electrodes 220. A coating 235 may be applied to cover lens 110. For example, coating 235 may be a hydrophobic coating, a hard coating, an anti-reflective coating, and any other suitable coating. Mechanical stack 130 may be coupled to a display 215 of device 100. The design of drive electrodes 225, sense electrodes 220 and substrate 230 may allow for the thickness of cover lens 110 to be reduced without introducing negative side effects typically caused by thin cover lenses 110, such as moisture sensitivity and retransmission effects. By reducing the thickness of cover lens 110, the size of device 100 may be reduced. The reduced size may improve portability and battery life. Furthermore, by reducing the thickness of cover lens 110, the amount of materials used in constructing device 100 may be reduced.

Mechanical stack 130 includes drive electrodes 225 and sense electrodes 220 disposed on different sides of substrate 230. The drive electrodes 225 and sense electrodes 220 are formed from fine lines of metal (FLM) or other conductive material. For example, drive electrodes 225 and/or sense electrodes 220 may be formed from copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns.

The drive electrodes 225 may be arranged orthogonally to the sense electrodes 220. The two layers of FLM may form a sensor by which touches may be detected. Due to the low resistance of the FLM, the resistances of drive electrodes 225 and sense electrodes 220 are lowered, which helps to improve touch detection. Furthermore, optimizations may be made to the layout of the sensor (e.g. size, shape, distance between, and/or configuration of the drive electrodes 225 and sense electrodes 220). As a result, the electric field generated by drive electrodes 225 and sense electrodes 220 is more uniform when compared to electric fields generated by drive electrodes 225 and sense electrodes 220 formed from other materials, such as indium tin oxides (ITO). The more uniform electric field improves the touch detection of touch sensor 120 such that the thickness of cover lens 110 may be reduced.

If the FLM mesh design is not used, certain undesired side effects may occur in device 100 when the thickness of cover lens 110 is reduced. For example, when drive electrodes 225 and sense electrodes 220 are formed using ITO, a cover lens 110 with thickness of 0.70 mm would experience several undesirable effects. First, the touch sensor 120 suffers from moisture sensitivity when the cover lens 110 is too thin. When a liquid such as water or sweat from a user's hand comes into contact with the cover lens 110, the touch sensor 120 may detect phantom touches on the cover lens 110 (i.e. false positive touches). In certain instances, the touch sensor 120 may detect rapid series of phantom touches even after the liquid has been removed from the cover lens 110. When the touch sensor 120 begins detecting the series of phantom touches, device 100 may respond with undesired behavior and/or become inoperable. For example, if a user with sweaty fingers touches the touch sensor 120, sweat from the finger may smear across the cover lens 110. The sweat may cause touch sensor 120 to determine that a touch occurred or is occurring when no such touch occurred or is occurring. As a result, device 100 behaves as if the user is touching the portion of touch sensor 120 in contact with the moisture, and device 100 may become unresponsive to actual touches made by the user. When the sweat is removed, the touch sensor 120 may experience difficulty adjusting to the absence of sweat on the touch sensor 120. As a result, the touch sensor 120 may fail to detect subsequent touches, such as for example, touches near the region of the touch sensor 120 that was in contact with the sweat. Although application of a coating that includes a hydrophobic material may alleviate problems caused by moisture, use of FLM to form drive electrodes 225 and sense electrodes 220 may alleviate these problems without application of such a coating.

Second, touch sensor 120 may begin suffering from retransmission effects when the cover lens 110 is too thin. When a user touches more than one portion of the cover lens 110, an effective short circuit may result between the touched portions. The short circuit may prevent touch sensor 120 from detecting the touches performed by the user. From the touch sensor's 120 perspective, these short circuits or anti-touches mask and/or cancel out the actual touches on cover lens 110. When the touch sensor 120 evaluates the received signal, the touch sensor 120 fails to distinguish the multiple touches from each other and/or from a situation where no touch occurred. From the user's perspective, device 100 may become unresponsive when the user touches more than one portion of the cover lens 110. For example, the user may pan two or more fingers across touch sensor 120 to indicate that the user wishes to zoom in on the display. However, retransmission effects may prevent touch sensor 120 from determining that two or more touches occurred. In other words, retransmission effects may prevent touch sensor 120 from distinguishing between the two or more touches made by the two or more fingers and/or between a touch occurring and no touch occurring. From the user's perspective, the device 100 may respond incorrectly and/or fail to respond altogether to the user's touch.

Figure 3A:
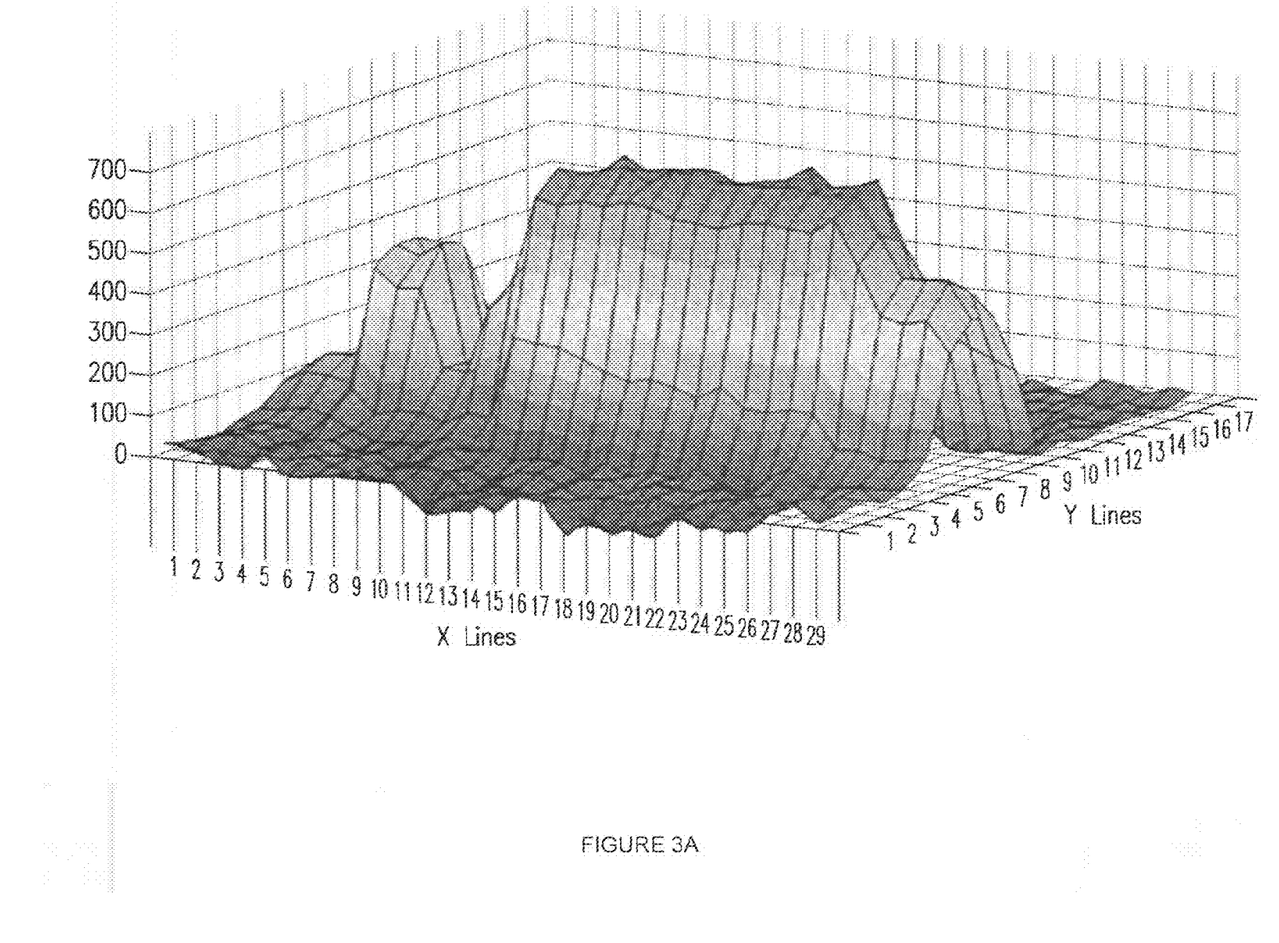
FIGS. 3A and 3B illustrate the performance of an example touch sensor of the example device of FIG. 1 affected by retransmission effects.
Figure 3B:
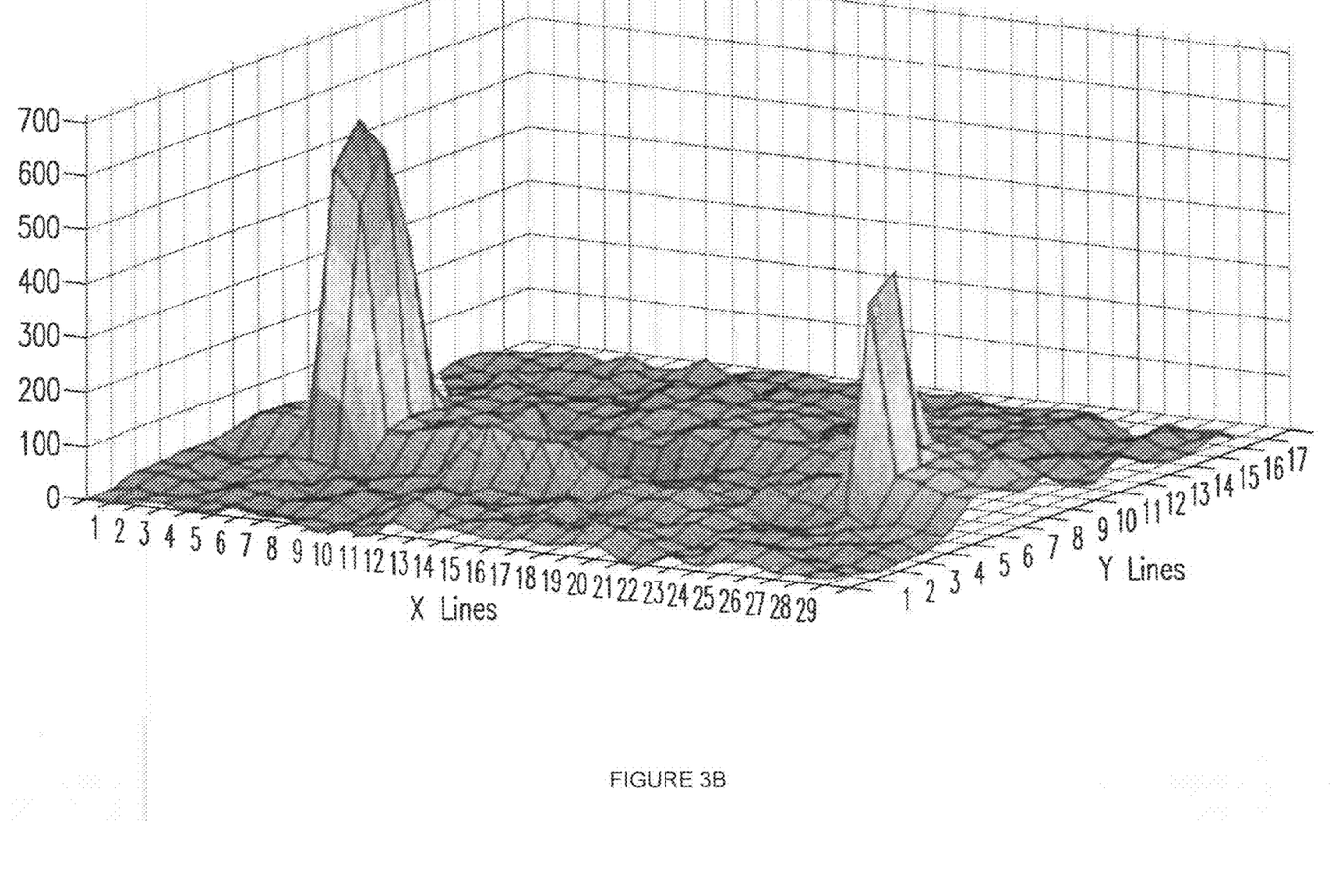

FIGS. 3A and 3B illustrate the performance of an example touch sensor 120 of the example device 100 of FIG. 1 affected by retransmission effects. FIG. 3A illustrates the signal measurements of touch sensor 120 when it detects touches across a region of touch sensor 120. In FIG. 3A, the touch has been grounded so as to minimize retransmission effects to better illustrate how retransmission effects affect touch sensor 120. As shown in FIG. 3A, the signal measurements of touch sensor 120 increases to its maximum near the touches. In particular embodiments, touch sensor 120 may detect the touches by determining where the signal measurements exceed a threshold value. FIG. 3B illustrates the signal response of touch sensor 120 to the same touches without minimizing and/or removing retransmission effects. Touch sensor 120 in FIG. 3B may be floating and/or not grounded. As shown in FIG. 3B, the signal response of touch sensor 120 does not include the rectangular peak as in FIG. 3A. As a result, touch sensor 120 may not detect the touches as occurring in the same region as in FIG. 3A. One reason that the signal response of touch sensor 120 in FIG. 3B is different from the signal response in FIG. 3A is that retransmission effects may cause negative signal levels to occur near the region of the touches. These negative signal levels may reduce the signal peaks caused by the touches. When retransmission effects are present at certain levels, the negative signal levels may be of sufficient magnitude to reduce undesirably the signal peaks caused by the touches such that touch sensor 120 may not detect the touches. As can be seen in FIG. 3B, the signal response becomes negative in several regions of touch sensor 120.

Particular measurements and calculations may be made to determine whether retransmission effects may render touch sensor 120 inoperable or unsatisfactory. For example, a retransmission level, $R_L$, of touch sensor 120 may be calculated according to the formula: $R_L=((V_G-V_F)/V_G) \times 100$. $V_G$ is the peak voltage of the signal response of touch sensor 120 when retransmission effects have been minimized and/or removed by, for example, grounding the touch. $V_F$ is the minimum voltage level (usually negative) of the signal response of touch sensor 120 without minimizing and/or removing retransmission effects. In certain embodiments, touch sensor 120 is considered to appropriately handle retransmission effects if $R_L$ is less than 140.

By using FLM to form drive electrodes 225 and sense electrodes 220, and by disposing drive electrodes 225 and sense electrodes 220 on a substrate 230 formed using PET, the thickness of cover lens 110 may be reduced while still reducing or eliminating the effects of moisture and/or retransmission effects. When using FLM, the electric field generated by drive electrodes 225 and sense electrodes 220 may become more uniform near the surface of touch sensor 120 thereby improving touch detection even when the thickness of cover lens 110 is reduced. Touch sensors 120 that use other materials, such as ITO, to form drive electrodes 225 and sense electrodes 220 may begin experiencing the side effects when cover lens 110 is 0.70 mm thick. However, this disclosure contemplates a touch sensor 120 that appropriately detects touches even with a cover lens 110 having a thickness from 0.1 mm to 0.5 mm. This disclosure further contemplates touch sensor 120 appropriately detecting touches even with a cover lens 110 having a thickness below 0.1 mm. Hence, by forming drive electrodes 225 and sense electrodes 220 in a two-layer FLM mesh, the thickness of cover lens 110 may be reduced while maintaining the operability of device 100.

For example, a more uniform electric field at the surface of touch sensor 120 may allow touch sensor 120 to properly detect moisture on the cover lens 110 rather than perceiving the moisture as a touch and to properly detect when that moisture has been removed rather than experience difficulty adjusting to the removal of that moisture. Moisture on cover lens 110 may reduce the resistance between nodes of touch sensor 120 such that an effect akin to a short circuit may occur between the nodes. This effect may cause touch sensor 120 to improperly detect one or more touches on touch sensor 120 caused by the moisture. A more uniform electric field at the surface of touch sensor 120 may reduce this effect such that touch sensor 120 may not improperly detect these one or more touches. For example, such a touch sensor 120 may disregard, as a touch, an effect caused by a liquid in contact with the cover lens. As another example, touch sensor 120 may determine that a detected touch is caused by moisture on touch sensor 120 rather than an actual touch and disregard the detected touch. As another example, the moisture or liquid may not interfere with the electric field generated by drive electrodes 225 and sense electrodes 220 in such a way as to cause touch sensor 120 to sense that a touch has occurred. Furthermore, the touch sensor 120 may disregard the moisture on cover lens 110 rather than detecting the moisture as false touches.

As another example, a more uniform electric field may reduce retransmission effects such that touch sensor 120 may properly detect two or more simultaneous touches on cover lens 110. Furthermore, due to the flexible nature of FLM and the PET substrate 230, drive electrodes 225, sense electrodes 220, and substrate 230 may resemble a sheet of flexible mesh film. In this manner, drive electrodes 225, sense electrodes 220, and substrate 230 may better accommodate curved displays 215 and curved cover lenses 110. For example, by using FLM and PET, touch sensor 120 may be formed on a curved, interior surface of an automobile.

Figure 4A:
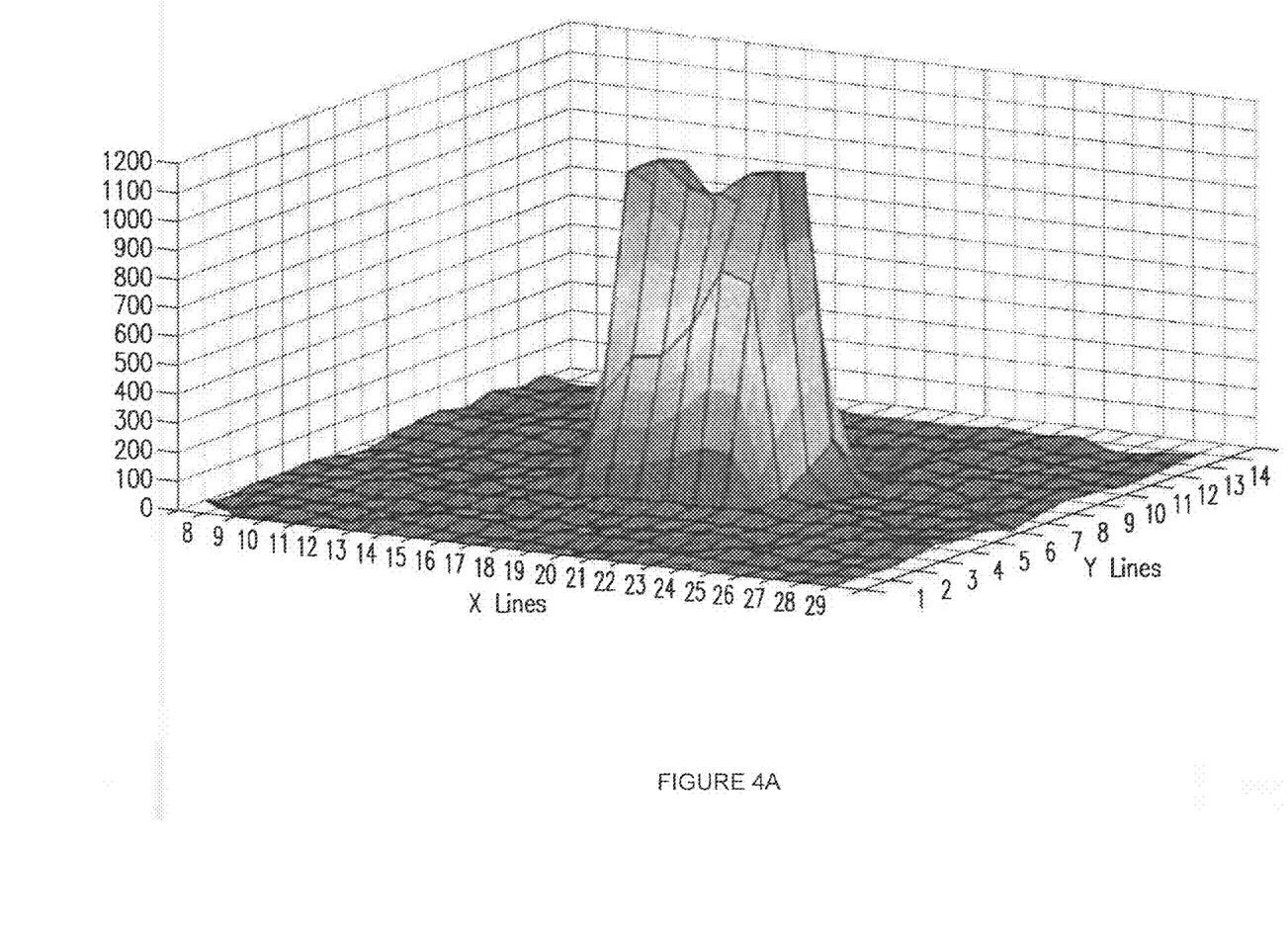
FIGS. 4A and 4B illustrate the performance of the example device of FIG. 1 using FLM to form electrodes.
Figure 4B:
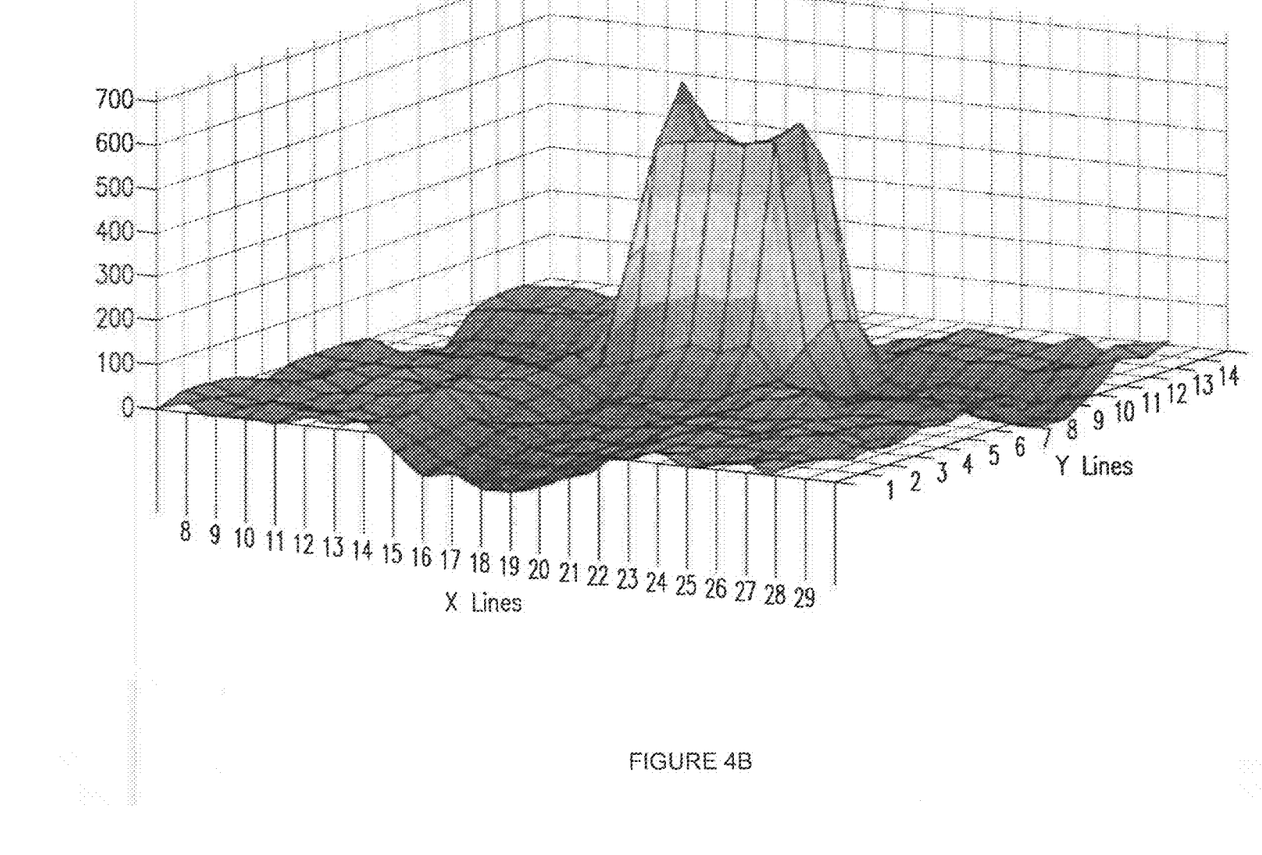

FIGS. 4A and 4B illustrate the performance of the example device 100 of FIG. 1 using FLM to form electrodes. FIG. 4A illustrates the signal response of touch sensor 120 when it detects touches. In FIG. 4A, the touch has been grounded so as to minimize retransmission effects to better illustrate how retransmission effects affect touch sensor 120. As shown in FIG. 4A, the signal response of touch sensor 120 increases to its maximum near the touches. FIG. 4B illustrates the signal response of touch sensor 120 to the same touches without minimizing and/or removing retransmission effects. Touch sensor 120 in FIG. 3B may be floating and/or not grounded. As shown in FIG. 4B, the signal response of touch sensor 120 still increases to its maximum near the touches. Although in this example, the magnitude of the signal response may have been reduced somewhat by retransmission effects, the retransmission effects may not be sufficiently strong to cause touch sensor 120 to fail to detect the touches.

In certain embodiments, due to the relative permittivity of plastic materials, the thickness of cover lens 110 may be reduced further while still reducing or eliminating the effects of moisture and/or retransmission effects by forming cover lens 110 with plastic. For example, this disclosure contemplates a touch sensor that includes a plastic cover lens 110, and drive electrodes 225 and sense electrodes 220 formed using FLM. The plastic cover lens 110 could have a thickness of approximately 0.1 mm to 0.5 mm without experiencing the side effects that may cause device 100 to respond incorrectly and/or fail to respond altogether to the user's touch. For example, the plastic cover lens 110 could have a thickness of approximately 0.1 mm, 0.2 mm, 0.3 mm, 0.4 mm, 0.5 mm, or any suitable thickness between these values without causing device 100 to respond incorrectly and/or fail to respond altogether to the user's touch. This disclosure contemplates deviations from the thicknesses described herein, such as deviations that may result from the manufacturing process used to create cover lens 110.

Plastic materials may provide one or more advantages in particular embodiments. For example, plastic may be flexible and resistant to shattering, which may improve durability and safety. The flexibility of plastic materials may reduce the probability that cover lens 110 will break or shatter during manufacturing of device 100. Plastic materials may be lighter and less costly than other materials used to form cover lens 110.

This disclosure contemplates any suitable configuration of the layers of mechanical stack 130. For example, mechanical stack 130 may include a hard coating and an air gap between OCA 210 and display 215. As another example, the OCA 210 in contact with display 215 may be an ultraviolet cured OCA. The first layer of OCA 210 may be disposed between the cover lens 110 and the substrate 230 with the conductive material forming the drive or sense electrodes. The mechanical stack 130 may also include a second layer of OCA 210 and a dielectric layer (which may be made of PET or another suitable material, similar to the substrate with the conductive material forming the drive or sense electrodes). As an alternative, where appropriate, a thin coating of a dielectric material may be applied instead of the second layer of OCA 210 and the dielectric layer. The second layer of OCA 210 may be disposed between the substrate 230 with the conductive material making up the drive or sense electrodes and the dielectric layer, and the dielectric layer may be disposed between the second layer of OCA 210 and an air gap to a display 215. As an example only and not by way of limitation, the cover lens 110 may have a thickness of approximately 0.4 mm; the first layer of OCA 210 may have a thickness of approximately 0.05 mm; the substrate 230 with the conductive material forming the drive or sense electrodes may have a thickness of approximately 0.05 mm; the second layer of OCA 210 may have a thickness of approximately 0.05 mm; and the dielectric layer may have a thickness of approximately 0.05 mm. As yet another example, the drive electrodes 225 may be disposed on the surface of the substrate 230 closer to the cover lens 110, and the sense electrodes 220 may be disposed on the surface of the substrate 230 closer to the display 215. This disclosure contemplates the thickness of any layer of mechanical stack 130 deviating from an expected thickness due to the manufacturing process used to create mechanical stack 130 and/or device 100. This disclosure contemplates any suitable mechanical stack 130 with any suitable number of any suitable layers made of any suitable materials and having any suitable thicknesses.

One or more portions of the substrate 230 of touch sensor 120 may be made of polyethylene terephthalate (PET) or another suitable material. The drive or sense electrodes in touch sensor 120 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less.

One or more drive electrodes 225 may together form a drive line running horizontally or vertically or in any suitable orientation. Similarly, one or more sense electrodes 220 may together form a sense line running horizontally or vertically or in any suitable orientation. In particular embodiments, drive lines may run substantially perpendicular to sense lines. Herein, reference to a drive line may encompass one or more drive electrodes 225 making up the drive line, and vice versa, where appropriate. Similarly, reference to a sense line may encompass one or more sense electrodes 220 making up the sense line, and vice versa, where appropriate.

Coating 235 may be applied to cover lens 110 to improve certain aspects of cover lens 110. For example, coating 235 may be an anti-reflective (AR) coating 235 that lowers the refractive index of the top surface of cover lens 110. When the refractive index of the top surface is too high, cover lens 110 may produce unwanted reflections (glare) in ambient light. In certain embodiments, applying AR coating 235 to cover lens 110 may lower the refractive index, which may reduce glare. In this manner, a user of device 100 may more clearly see the display of device 100 rather than a reflection when the user looks at cover lens 110 in ambient light.

As another example, coating 235 may be a lipophobic coating 235 that repels oils. In certain embodiments, applying lipophobic coating 235 to cover lens 110 may repel oils that would otherwise contact device 100. For example, without lipophobic coating 235, when a user touches cover lens 110, the oil on the user's finger may remain on cover lens 110 and may appear like a fingerprint on cover lens 110. With lipophobic coating 235, the oils may remain on the user's finger rather than transferring to a surface of device 100. As a result, the user's view of the display of device 100 may not be obstructed by fingerprints.

As yet another example, coating 235 may be an anti-scratch coating 235 that protects the surface of cover lens 110 from scratching. In certain embodiments, applying anti-scratch coating 235 to cover lens 110 may reduce the appearance of scratches. As a result, if a user of device 100 presses too hard on touch sensor 120 or drops device 100, anti-scratch coating 235 may prevent cover lens 110 from getting scratched and/or reduce the appearance of scratches that do occur on cover lens 110. In this manner, the user's view of the display of device 100 may not be obstructed by scratches.

Figure 5:
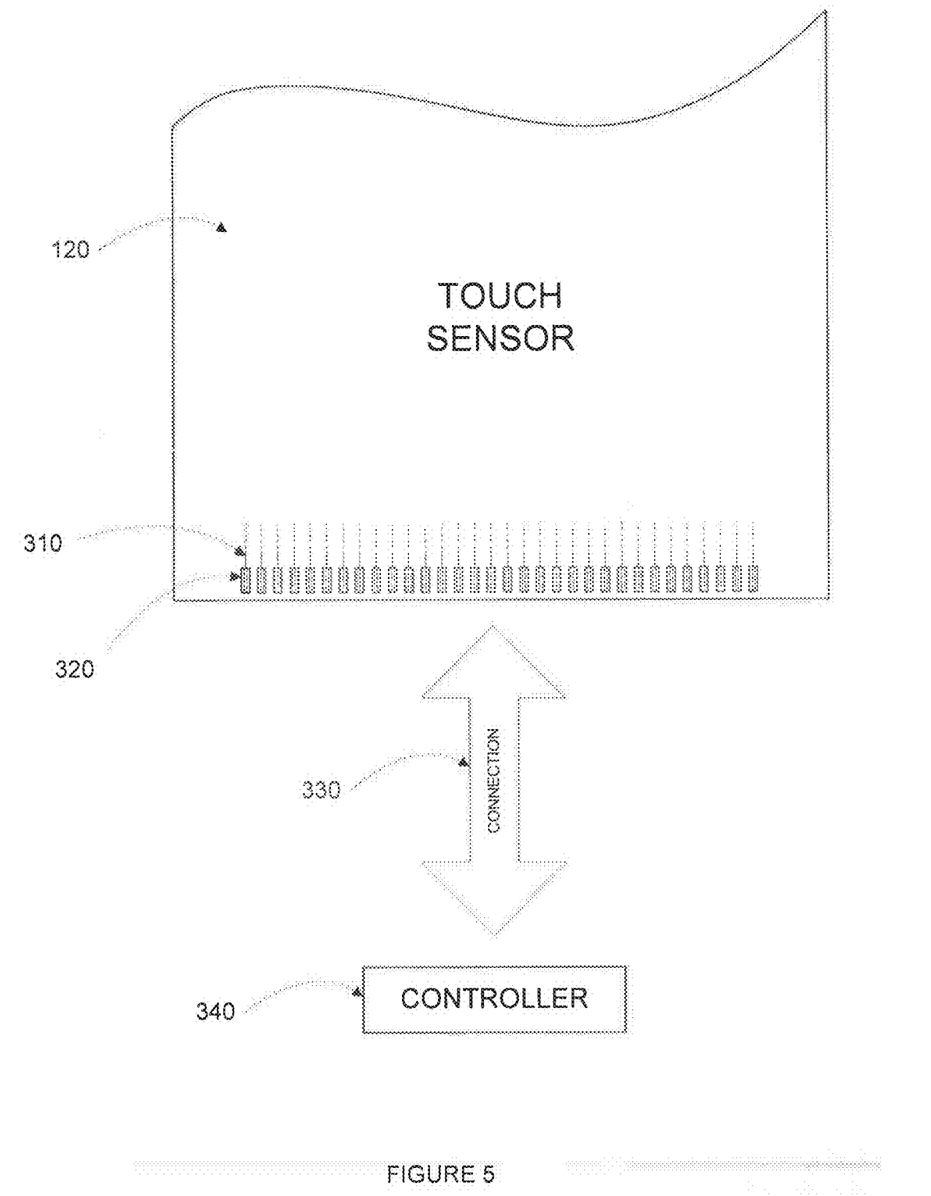
FIG. 5 illustrates an example touch sensor and an example touch-sensor controller of the example device of FIG. 1.

FIG. 5 illustrates an example touch sensor 120 and an example touch-sensor controller 340 of the example device 100 of FIG. 1. Touch sensor 120 and touch-sensor controller 340 may detect the presence and location of a touch or the proximity of an object within a touch-sensitive area of touch sensor 120. Herein, reference to a touch sensor 120 may encompass both the touch sensor 120 and its touch-sensor controller 340, where appropriate. Similarly, reference to a touch-sensor controller 340 may encompass both the touch-sensor controller 340 and its touch sensor 120, where appropriate. Touch sensor 120 may include one or more touch-sensitive areas, where appropriate. Touch sensor 120 may include an array of drive and sense electrodes (or an array of electrodes of a single type) disposed on one or more substrates, which may be made of a dielectric material. Herein, reference to a touch sensor 120 may encompass both the electrodes of the touch sensor and the substrate(s) that they are disposed on, where appropriate. Alternatively, where appropriate, reference to a touch sensor 120 may encompass the electrodes of the touch sensor, but not the substrate(s) that they are disposed on.

Touch sensor 120 may implement a capacitive form of touch sensing. Touch sensor 120 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 340) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 340 may measure the change in capacitance. By measuring changes in capacitance throughout the array, touch-sensor controller 340 may determine the position of the touch or proximity within the touch-sensitive area(s) of touch sensor 120.

As described above, a change in capacitance at a capacitive node of touch sensor 120 may indicate a touch or proximity input at the position of the capacitive node. Touch-sensor controller 340 may detect and process the change in capacitance to determine the presence and location of the touch or proximity input. Touch-sensor controller 340 may then communicate information about the touch or proximity input to one or more other components (such one or more central processing units (CPUs) of device 100, which may respond to the touch or proximity input by initiating a function of the device (or an application running on the device 100). This disclosure contemplates any suitable touch-sensor controller 340 having any suitable functionality with respect to any suitable device 100 and any suitable touch sensor 120.

Touch-sensor controller 340 may be one or more integrated circuits (ICs), such as for example general-purpose microprocessors, microcontrollers, programmable logic devices or arrays, application-specific ICs (ASICs). In particular embodiments, touch-sensor controller 340 comprises analog circuitry, digital logic, and digital non-volatile memory. In particular embodiments, touch-sensor controller 340 is disposed on a flexible printed circuit (FPC) bonded to the substrate of touch sensor 120, as described below. In particular embodiments, multiple touch-sensor controllers 340 are disposed on the FPC. In some embodiments, the FPC may have no touch-sensor controllers 340 disposed on it. The FPC may couple touch sensor 120 to a touch-sensor controller 340 located elsewhere, such as for example, on a printed circuit board of the device. Touch-sensor controller 340 may include a processor unit, a drive unit, a sense unit, and a storage unit. The drive unit may supply drive signals to the drive electrodes of touch sensor 120. The sense unit may sense charge at the capacitive nodes of touch sensor 120 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 120. The processor unit may also track changes in the position of a touch or proximity input within the touch-sensitive area(s) of touch sensor 120. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 310 of conductive material disposed on the substrate of touch sensor 120 may couple the drive or sense electrodes of touch sensor 120 to connection pads 320, also disposed on the substrate of touch sensor 120. As described below, connection pads 320 facilitate coupling of tracks 310 to touch-sensor controller 340. Tracks 310 may extend into or around (e.g. at the edges of) the touch-sensitive area(s) of touch sensor 120. Particular tracks 310 may provide drive connections for coupling touch-sensor controller 340 to drive electrodes of touch sensor 120, through which the drive unit of touch-sensor controller 340 may supply drive signals to the drive electrodes. Other tracks 310 may provide sense connections for coupling touch-sensor controller 340 to sense electrodes of touch sensor 120, through which the sense unit of touch-sensor controller 340 may sense charge at the capacitive nodes of touch sensor 120. Tracks 310 may be made of fine lines of metal or other conductive material. As an example and not by way of limitation, the conductive material of tracks 310 may be copper or copper-based and have a width of approximately 100 μm or less. As another example, the conductive material of tracks 310 may be silver or silver-based and have a width of approximately 100 μm or less. In particular embodiments, tracks 310 may be made of fine lines of metal or other conductive material in whole or in part. Although this disclosure describes particular tracks made of particular materials with particular widths, this disclosure contemplates any suitable tracks made of any suitable materials with any suitable widths. In addition to tracks 310, touch sensor 120 may include one or more ground lines terminating at a ground connector (which may be a connection pad 320) at an edge of the substrate of touch sensor 120 (similar to tracks 310).

Connection pads 320 may be located along one or more edges of the substrate, outside the touch-sensitive area(s) of touch sensor 120. As described above, touch-sensor controller 340 may be on an FPC. Connection pads 320 may be made of the same material as tracks 310 and may be bonded to the FPC using an anisotropic conductive film (ACF). Connection 330 may include conductive lines on the FPC coupling touch-sensor controller 340 to connection pads 320, in turn coupling touch-sensor controller 340 to tracks 310 and to the drive or sense electrodes of touch sensor 120. In another embodiment, connection pads 320 may be connected to an electro-mechanical connector (such as a zero insertion force wire-to-board connector); in this embodiment, connection 330 may not need to include an FPC. This disclosure contemplates any suitable connection 330 between touch-sensor controller 340 and touch sensor 120.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a secure digital card, a secure digital drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
    a substrate;
    a touch sensor disposed on the substrate;
    a conductive mesh forming portions of the touch sensor, the conductive mesh comprising fine lines of metal; and
    a cover lens coupled to the touch sensor, wherein:
        the cover lens is less than or equal to 0.4 mm thick;
        the cover lens comprises plastic; and
        a retransmission level of the touch sensor is less than 140, wherein the retransmission level comprises a ratio between:
            a difference between a peak voltage of a signal response of the touch sensor when a detected touch is grounded and a minimum voltage of a signal response of the touch sensor when a detected touch is not grounded; and
            the peak voltage.

2. The apparatus of claim 1, wherein the plastic is at least one of polyethylene terephthalate and polymethyl methacrylate.

3. The apparatus of claim 1, wherein the plastic is polycarbonate.

4. The apparatus of claim 1, wherein the cover lens is less than or equal to 0.3 mm thick.

5. The apparatus of claim 1, wherein the cover lens is less than or equal to 0.2 mm thick.

6. The apparatus of claim 1, wherein the touch sensor is operable to disregard, as a touch, an effect caused by a liquid in contact with the cover lens.

7. The apparatus of claim 6, wherein the touch sensor is operable, after the liquid is removed, to properly detect a touch on a portion of the cover lens with which the liquid was in contact.

8. The apparatus of claim 1, wherein the touch sensor is operable to properly detect at least two simultaneous touches on the cover lens.

9. A system comprising:
   a display element operable to present a visual display;
   a sensor element coupled to the display element, the sensor element comprising a plurality of electrode elements formed from a conductive mesh, the sensor element operable to detect an object;
   a lens element coupled to the sensor element, wherein:
      the lens element is less than or equal to 0.4 mm thick;
      the lens element comprises plastic; and
      a retransmission level of the sensor element is less than 140, wherein the retransmission level comprises a ratio between:
         a difference between a peak voltage of a signal response of the touch sensor when a detected touch is grounded and a minimum voltage of a signal response of the touch sensor when a detected touch is not grounded; and
         the peak voltage.

10. The system of claim 9, wherein the plurality of electrode elements comprise a sense element and a drive element capacitively coupled to the sense element.

11. The system of claim 10, wherein the sense element is disposed on a first surface of a substrate and the drive electrode is disposed on a second surface of the substrate.

12. The system of claim 9, wherein the plastic is at least one of polyethylene terephthalate and polymethyl methacrylate.

13. The system of claim 9, wherein the plastic is polycarbonate.

14. An apparatus comprising:
   a touch sensor comprising a conductive mesh forming a plurality of electrodes, the plurality of electrodes comprising:
      a drive electrode; and
      a sense electrode capacitively coupled to the drive electrode; and
   a cover lens coupled to the touch sensor, wherein:
      the cover lens is less than or equal to 0.4 mm thick;
      the cover lens comprises plastic; and
      a retransmission level of the touch sensor is less than 140, wherein the retransmission level comprises a ratio between:
         a difference between a peak voltage of a signal response of the touch sensor when a detected touch is grounded and a minimum voltage of a signal response of the touch sensor when a detected touch is not grounded; and
         the peak voltage.

15. The system of claim 9, wherein the lens element is less than or equal to 0.2 mm thick.

16. The system of claim 9, wherein the sensor element is operable to disregard, as a touch, an effect caused by a liquid in contact with the lens element.

17. The system of claim 16, wherein the sensor element is operable, after the liquid is removed, to properly detect a touch on a portion of the lens element with which the liquid was in contact.

18. The system of claim 9, wherein the sensor element is operable to properly detect at least two simultaneous touches on the lens element.

19. The system of claim 14, wherein the lens element is less than or equal to 0.3 mm thick.

20. The apparatus of claim 14, wherein the cover lens is less than or equal to 0.3 mm thick.

21. The apparatus of claim 14, wherein the cover lens is less than or equal to 0.2 mm thick.

22. The apparatus of claim 14, wherein the plastic is at least one of polyethylene terephthalate and polymethyl methacrylate.

23. The apparatus of claim 14 further comprising an anti-reflective coating disposed on the cover lens.

24. The apparatus of claim 1, wherein the cover lens is not coupled to a coating that includes a hydrophobic material.

* * * * *